Jan. 16, 1945. W. C. GRABAU 2,367,210
VOLTAGE REGULATOR
Filed June 12, 1942
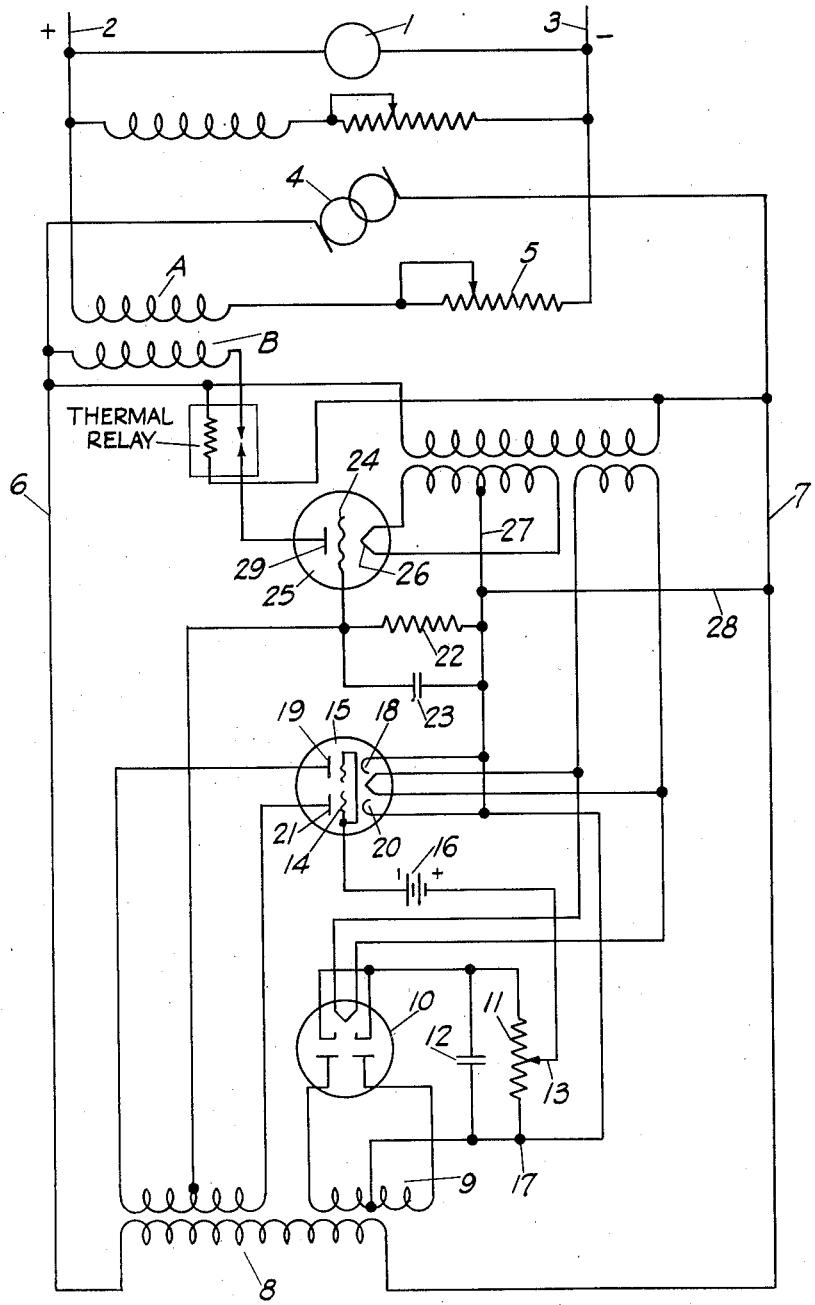
INVENTOR
WILLIAM CHRISTIAN GRABAU
BY
Ezekiel Wolf
ATTORNEY Patented Jan. 16, 1945

2,367,210

UNITED STATES PATENT OFFICE 2,367,210

VOLTAGE REGULATOR

William Christian Grabau, Brighton, Mass., assignor to Submarine Signal Company, Boston, Mass., a corporation of Maine Application June 12, 1942, Serial No. 446,785

2 Claims. (Cl. 171—119)

The present invention relates to voltage regulation in power supply circuits and particularly to alternating current supply circuits.

In the present invention the voltage of the alternating current source is regulated by impressing the voltage on the rectifier circuit the output of which controls a vacuum tube which, in turn, controls a gaseous control tube whose cathode-anode circuit is connected across the alternating current supply source.

A further feature of the present invention is that the voltage of the supply source is controlled through a split field circuit with the field for no-load supplied from a direct current source and the field for the varying or increasing load supplied from the alternating current source through the gaseous control tube in such a manner that this portion of the field is supplied with pulsating direct current.

Further merits and advantages in the present invention will be more readily understood from the description given in the specification below and taken in connection with the drawing illustrating the circuit of the present invention.

In the figure the supply source is represented as a motor-generator set in which the motor 1 is driven from a direct current supply source supplied through the lines 2 and 3. The generator 4 has a field A in series with a resistor 5 which is energized from the direct current lines 2 and 3. Connected across the generator output lines 6 and 7 is a transformer 8 which has a secondary 9 connected across a full-wave rectifier tube 10 the rectified output of which is impressed across the potentiometer 11 across which is also connected the capacity 12. An adjustable tap 13 adjusted along the potentiometer resistance 11 is connected to the grids 14 of a double triode tube 15 in series with a biasing battery 16 which is connected in the circuit with its negative side nearest the grid 14. The voltage drop in the resistance 11 from the slide wire connection 13 to the point 17 is applied in the opposite direction to that of the battery 16 so that as the voltage across the potentiometer 11 drops, the bias on the grid 14 of the tube 15 will increase. Tube 15 has its cathode-anode circuit energized in the same manner as a full-wave rectifier so that conduction is obtained in one half of the cycle from the cathode 18 to the anode 19 and in the other half of the cycle from the cathode 20 to the anode 21. The output of the cathode-anode circuits are connected across the resistance 22 across which is connected a condenser 23. The resistance 22 is also connected in circuit with the grid 24 of the gaseous control tube 25. The cathode-anode circuit of the gaseous control tube 25 comprises the cathode 26, the line connections 27, 28, the alternating current generator 4, the winding B of the generator field, the thermo-relay and the anode 29 of the thyratron tube 25. Current will be passed through the winding B when the gaseous control tube discharges which may occur during the positive half cycle of the alternating current delivered by the generator when the grid 24 has a bias voltage of the proper value. For no-load conditions the grid 24 is biased to open the circuit through the winding B and the field in the generator is at such times due entirely to the field winding A.

If the voltage should drop due to increased load, the voltage across the transformer 8 will drop and therefore the positive voltage in the resistance 11, permitting the bias battery 16 to reduce or block off the flow of current in the output circuit of the tube 15 and thereby decrease the potential across the resistance 22 and the negative bias as applied to the grid 24 of the thyratron tube, permitting current to pass through the thyratron tube for greater periods of the alternating current cycle supplied by the output of the alternating current generator. This will increase the generator field and increase the voltage delivered by the alternator until the voltage supplied across the resistance 11 has increased to such a value as to react to cut out the current flowing in the winding B. At no-load the resistor 5 is so adjusted to produce the desired voltage without current flowing in the winding B. As the load comes on, the increased excitation necessary to maintain voltage regulation is supplied through the auxiliary or B winding of the generator.

The present system is particularly useful for voltage regulation in frequency systems above 60 cycles as it permits control to be maintained with the handling of comparatively small current variations in the generator field windings.

The system is further useful inasmuch as voltage is obtained independent of any phase regulatory device and will maintain steady conditions under very great voltage variations.

Having now described my invention, I claim:

1. A voltage control circuit for a high frequency alternating current generator having two windings, a direct current source for applying a given value of current for energizing one of said windings, and a different rectified source of power produced from the high frequency source for energizing said second winding with rectified current comprising a gaseous control tube having cathode, anode and grid control electrodes with the cathode and anode connected in a series circuit with said second winding across said alternating current source, and means for controlling the potential applied to said grid including a rectifier energized by said alternating current source for producing a rectified potential corresponding to the value of said alternating current potential, and means operated through said last potential for controlling the biasing value of potential on said grid for keeping the potential of said alternating current source constant.

2. A voltage control circuit for a high frequency alternating current generator having two windings, a direct current source for applying a given value of current for energizing one of said windings, and a different rectified source of power produced from the high frequency source for energizing said second winding with rectified current comprising a gaseous control tube having cathode, anode and grid control electrodes with the cathode and anode connected in a series circuit with said second winding across said alternating current source, and means for controlling the potential applied to said grid including a rectifier energized by said alternating current source for producing a rectified potential corresponding to the value of said alternating current potential, a double triode vacuum tube and circuit having an anode-cathode circuit energized from said alternating current source with grid means controlled by said last-mentioned potential, said anode-cathode circuit also having a resistor connected in the grid circuit of said control tube for establishing a grid bias variable in accordance with potential changes across the alternating current source for maintaining the potential of said source constant.

WILLIAM CHRISTIAN GRABAU.